(12) United States Patent
Trischler et al.

(10) Patent No.: US 11,379,736 B2
(45) Date of Patent: Jul. 5, 2022

(54) MACHINE COMPREHENSION OF UNSTRUCTURED TEXT

(71) Applicant: Microsoft Technology Licensing, LLC, Redmond, WA (US)

(72) Inventors: Adam Trischler, Montreal (CA); Philip Bachman, Montreal (CA); Xingdi Yuan, Westmount (CA); Alessandro Sordoni, Montreal (CA); Zheng Ye, North York (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 1394 days.

(21) Appl. No.: 15/598,139

(22) Filed: May 17, 2017

(65) Prior Publication Data

US 2017/0337479 A1 Nov. 23, 2017

Related U.S. Application Data

(60) Provisional application No. 62/337,720, filed on May 17, 2016.

(51) Int. Cl.
*G06N 5/04* (2006.01)
*G06F 40/30* (2020.01)
*G06F 40/279* (2020.01)
*G06N 3/04* (2006.01)

(52) U.S. Cl.
CPC ............. *G06N 5/04* (2013.01); *G06F 40/279* (2020.01); *G06F 40/30* (2020.01); *G06N 3/0445* (2013.01)

(58) Field of Classification Search
CPC .............................. G06N 5/04; G06N 3/0445
USPC .......................................................... 706/30
See application file for complete search history.

(56) References Cited

PUBLICATIONS

Kadlec et al ("Text Understanding with the Attention Sum Reader Network" Mar. 2016 (Year: 2016).*
Wang et al ("Learning Natural Language Inference with LSTM" Dec. 2015) (Year: 2016).*
Severyn et al ("Modeling Relational Information in Question-Answer Pairs with Convolutional Neural Networks"Apr. 2016) (Year: 2016).*
Dagan et al ("Probabilistic Textual Entailment: Generic Applied Modeling of Language Variability" 2004) (Year: 2004).*
Trischler et al ("Natural Language Comprehension with the EpiReader" Jun. 2016) (Year: 2016).*

(Continued)

*Primary Examiner* — Lut Wong (57) ABSTRACT

Described herein are systems and methods for providing a natural language comprehension system that employs a two-stage process for machine comprehension of text. The first stage indicates words in one or more text passages that potentially answer a question. The first stage outputs a set of candidate answers for the question, along with a first probability of correctness for each candidate answer. The second stage forms one or more hypotheses by inserting each candidate answer into the question and determines whether a sematic relationship exists between each hypothesis and each sentence in the text. The second processing circuitry generates a second probability of correctness for each candidate answer and combines the first probability with the second probability to produce a score that is used to rank the candidate answers. The candidate answer with the highest score is selected as a predicted answer.

20 Claims, 9 Drawing Sheets

(56) References Cited

PUBLICATIONS

Hill, et al., "The Goldilocks Principle: Reading Children's Books with Explicit Memory Representations", Retrieved From: <<https://pdfs.semanticscholar.org/49b4/2d2988b388938bb799b487b253388ab29c2a.pdf>>, Nov. 6, 2015, 65 Pages.

Martinez, et al., "Simple similarity-based question answering strategies for biomedical text", Retrieved From: <<http://web.science.mq.edu.au/~diego/publications/qa4mre12.pdf>>, Jan. 1, 2012, 13 Pages.

"International Search Report and Written Opinion Issued in PCT Application No. PCT/US2017/033159", dated Aug. 31, 2017, 19 Pages. (MS# 800026-WO-PCT).

Sachan, et al., "Learning Answer-Entailing Structures for Machine Comprehension", In Proceedings of the 53rd Annual Meeting of the Association for Computational Linguistics and the 7th International Joint Conference on Natural Language Processing, vol. 1, Jul. 26, 2015, pp. 239-249.

Sukhbaatar, et al., "End-to-End Memory Networks", In Proceedings of the Advances in Neural Information Processing Systems, Nov. 24, 2015, 11 Pages.

Trischler, et al., "A Parallel-Hierarchical Model for Machine Comprehension on Sparse Data", Retrieved From: <<https://arxiv.org/pdf/1603.08884.pdf>>, Mar. 29, 2016, 9 Pages.

Vinyals, et al., "Pointer Networks", In Proceedings of Annual Conference on Neural Information Processing Systems, Dec. 7, 2015, pp. 1-9.

Trischler, Adam, "Natural Language Comprehension with the EpiReader," arXiv:1606.02270v1 [cs.CL] Jun. 7, 2016.

\* cited by examiner

MACHINE COMPREHENSION OF UNSTRUCTURED TEXT

CROSS-REFERENCE TO RELATED APPLICATION(S)

This application claims priority to U.S. Provisional Application No. 62/337,720 entitled "Natural Language Comprehension With The EpiReader," filed on May 17, 2016, of which the entire disclosure is hereby incorporated by reference in its entirety.

BACKGROUND

Comprehension of natural language by machines, at a near-human level, is a major goal for Artificial Intelligence. Indeed, most human knowledge is collected in the natural language of text. Machine comprehension of unstructured, real-world text has therefore garnered significant attention from scientists, engineers, and scholars. This is due, at least in part, to the fact many natural language processing tasks, such as information extraction, relation extraction, text summarization, or machine translation, depend implicitly or explicitly on a machine's ability to understand and reason with natural language.

SUMMARY

Embodiments disclosed herein provide a natural language comprehension system that employs cascaded first and second processing circuitries. The first processing circuitry analyzes the text and indicates one or more entities that potentially answer a question. The first processing circuitry outputs a set of candidate answers for the question, along with a first probability of correctness for each candidate answer. The second processing circuitry forms one or more hypotheses by inserting each candidate answer into the question and determines whether a sematic relationship exists between each hypothesis and each sentence in the text. The semantic comparisons implemented by the second processing circuitry can be based on the concept of recognizing textual entailment, also known as natural language interference. Based on the comparisons, the second processing circuitry generates a second or revised probability of correctness for each candidate answer and combines the first probability with the second probability to produce a score that is used to rank the candidate answers. The candidate answer with the highest score is selected as a predicted answer.

In one aspect, a system includes a first processing circuitry, a second processing circuitry, and one or more storage devices that store computer executable instructions that when executed by the first and the second processing circuitries, perform a method. The method includes processing, by the first processing circuitry, a text and a question relating to the text to produce a set of candidate answers to the question. Each candidate answer in the set of candidate answers is included in the text. The method further includes processing, by the second processing circuitry, the text and a set of hypotheses by forming a hypothesis by inserting each candidate answer into the question, where each hypothesis is included in the set of hypotheses, and determining a similarity between the text and each hypothesis. The candidate answer in the hypothesis that has the highest similarity is output as a predicted answer to the question.

In another aspect, a method includes receiving a Cloze-style question that relates to a text and processing, by first processing circuitry, the text and the Cloze-style question to produce a set of candidate answers to the Cloze-style question. Each candidate answer in the set of candidate answers is included in the text. The method further includes processing, by second processing circuitry, the text and a set of hypotheses to determine a predicted answer. The operation of processing, by the second processing circuitry, includes forming a hypothesis by inserting each candidate answer into the Cloze-style question, wherein each hypothesis is included in the set of hypotheses; determining a similarity between the text and each hypothesis; and outputting the candidate answer in the hypothesis with the highest similarity as a predicted answer for the Cloze-style question.

In yet another aspect, a method includes determining a set of possible answers to a question based on a coarse review of the question with a text. A first probability of correctness is determined for each possible answer and, based on the first probability associated with each possible answer, a set of candidate answers is determined. A hypothesis is then formed for each candidate answer, where the hypothesis includes the candidate answer inserted into the question. For each hypothesis, an entailment is measured based on a semantic comparison of the hypothesis with the text. A second probability of correctness is determined for each candidate answer based on the measured entailment. The first and the second probabilities associated with each hypothesis are combined to produce a score. A predicted answer is then determined based on the score associated with each candidate answer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide a natural language comprehension system that employs a two-stage process for machine comprehension of text. The text is typically included in a document, such as a web page, a book, a manual, a paper, or any other suitable document that includes one or more passages of text. The text includes one or more sentences, with each sentence including a sequence of words. The terms "entity" or "entities" are used herein to represent a word, a sequence of words, and/or a noun phrase in the text.

The first stage, or first processing circuitry, indicates one or more entities in a document that potentially answer a received question. The indicated entities are included in a set of candidate answers, where the set includes one or more candidate answers. The first processing circuitry outputs the set of candidate answers along with a first probability of correctness for each candidate answer.

The second stage, or second processing circuitry, forms one or more hypotheses by inserting each candidate answer into the question and determining whether a sematic relationship exists between each hypothesis and each sentence in the text. For each hypothesis, the second processing circuitry can measure and aggregate the similarities between all of the sentences in the text and the hypothesis. The second processing circuitry generates a second probability of correctness for each candidate answer and combines the first probability with the second probability to produce a score for each candidate answer. The candidate answers are then ranked based on the score and the candidate answer with the highest score is provided as a predicted answer.

Embodiments of the present disclosure provide a trade-off between computational complexity and accuracy. In some instances, the operations of the second processing circuitry can be complex and/or computationally expensive to run. The first processing circuitry may reduce this cost by filtering or reducing the number of candidate answers that is processed by the second processing circuitry. Additionally or alternatively, embodiments of the present disclosure provide an architecture that is end-to-end trainable and that employs mathematical operations that are fully differential.

Figure 1:
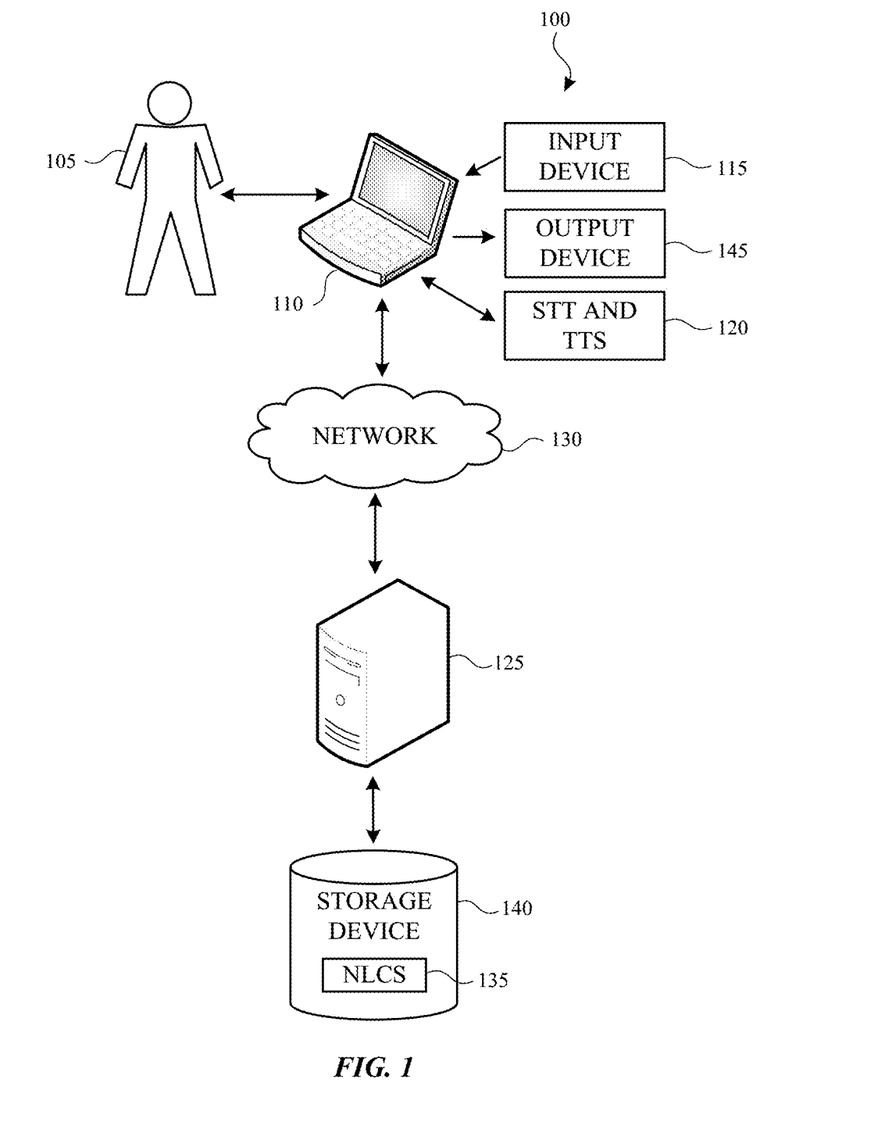
FIG. 1 illustrates an example system that can include a natural language comprehension system.

FIG. 1 illustrates an example system that can include a natural language comprehension system. The system 100 allows a user 105 to submit a question associated with the text in a document through a client-computing device 110. The client-computing device 110 may include, or be connected to, an input device 115 that receives the question. The question can be submitted as a textual question (e.g., written) or as a spoken question that is converted to a textual question (e.g., using a speech-to-text application (STT) 120). The input device 115 may be any suitable type of input device or devices configured to receive the question. In non-limiting examples, the input device 115 may be a keyboard (actual or virtual) and/or a microphone.

The client-computing device 110 is configured to access one or more server-computing devices (represented by server-computing device 125) through one or more networks (represented by network 130) to interact with a natural language comprehension system (NLCS) 135 stored on one or more storage devices (represented by storage device 140). As will be described in more detail later, the NLCS 135 processes the question and the text in the document to predict an answer to the question. The prediction of the answer can cause the answer to be provided to the user 105 through an output device 145 that is in, or connected to, the client-computing device 110. In non-limiting examples, the output device is a display that displays the predicted answer and/or a speaker that "speaks" the predicted answer (e.g., using a text-to-speech application (TTS) 120).

In one or more embodiments, the client-computing device 110 is a personal or handheld computing device having both the input and output devices 115, 145. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with a NLCS may be utilized.

As should be appreciated, FIG. 1 is described for purposes of illustrating the present methods and systems and is not intended to limit the disclosure to a particular sequence of steps or a particular combination of hardware or software components.

Figure 2:
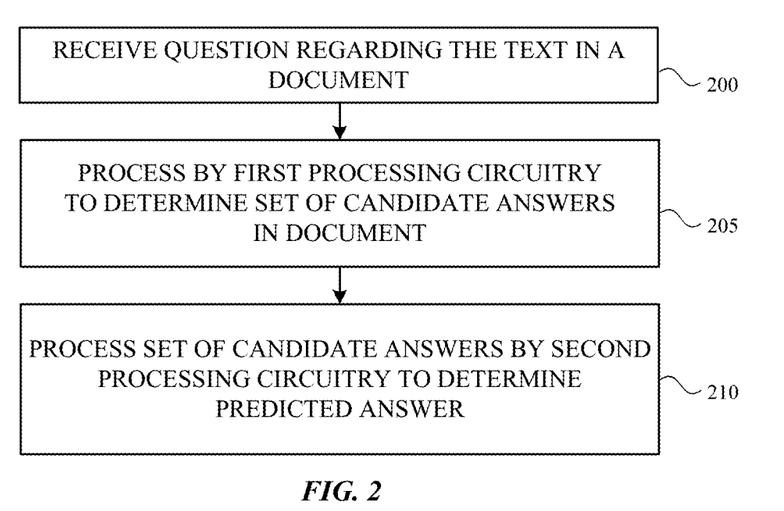
FIG. 2 is a flowchart depicting a method of predicting an answer to a question through natural language comprehension.

FIG. 2 is a flowchart depicting a method of predicting an answer to a question through natural language comprehension. Initially, as shown in block 200, a question that is supported by (e.g., relates to) the text in a document is received. In some embodiments, the question is a Cloze-style question that includes a sentence or sequence of words with one or more entities removed (e.g., blank). One example of a Cloze-style question is a "fill-in-the-blank" question. The embodiments disclosed herein are described as using a Cloze-style question having one missing entity (e.g., one blank), although embodiments are not limited to this question format or type.

The question and the document are then processed by first processing circuitry to determine or predict a set of candidate answers for the blank(s) (block 205). The set of candidate answers is derived or obtained from the text. In one embodiment, the first processing circuitry performs a coarse review of the text and points to one or more entities in the text that are possible answers to the question. The first processing circuitry may then filter or reduce the number of possible answers to produce and rank one or more probable answers. Some or all of the probable answers form a set of candidate answers. The operations performed by the first processing circuitry are described in more detail in conjunction with FIGS. 3 and 4.

Next, as shown in block 210, the set of candidate answers is processed by the second processing circuitry to determine which answer in the set of candidate answers is the predicted answer. In one embodiment, the second processing circuitry includes a pair of convolutional networks whose outputs are connected to a neural network (e.g., one or more recurrent neural networks having gated recurrent units (GRUs)). The second processing circuitry re-ranks the probable answer(s) based on a deeper semantic comparison with the text. The semantic comparisons implemented by the second processing circuitry are based on the concept of recognizing textual entailment, also known as natural language interference. Based on the re-ranking, the second processing circuitry outputs a predicted answer to the question. The operations performed by the second processing circuitry are described in more detail in conjunction with FIGS. 5 and 6.

Figure 3:
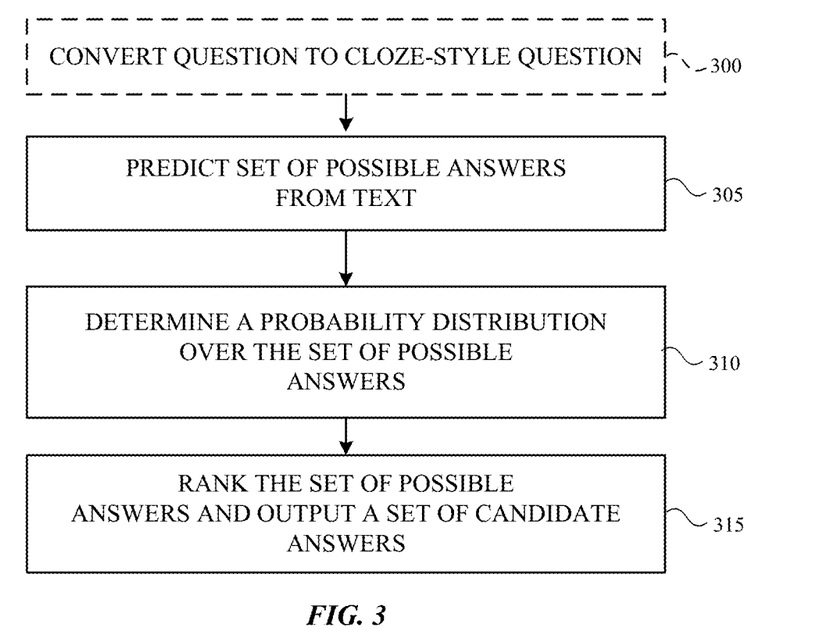
FIG. 3 is a flowchart illustrating a method of determining a set of candidate answers to a question from the text in a document.

FIG. 3 is a flowchart illustrating a method of determining a set of candidate answers to a question from the text in a document. FIG. 3 depicts the operations that may be performed in block 205 in FIG. 2. The method selects a set of candidate answers by pointing to their locations in the supporting text. A first processing circuitry performs a shallow or coarse comparison of the question with the supporting text to determine one or more possible answers to the question and a probability associated with each possible answer. The first processing circuitry ranks the possible answer(s) based on the associated probabilities and selects a given number of ranked possible answer(s) as a set of candidate answers (e.g., a set of probable answers). This selection can be based on a threshold or on a predetermined number of probable answers (e.g., the top five or ten probable answers).

Initially, a received question is formatted or re-written as a Cloze-style question at block 300 when the question is not drafted as a Cloze-style question. Block 300 is optional and is not performed when the question is presented as a Cloze-style question.

Next, as shown in block 305, the question and the document are processed by the first processing circuitry to predict a set of possible answers from the text in the document. In one embodiment, the first processing circuitry is a neural network that receives the document and the question. In particular, the neural network is configured as a Pointer Network that uses a pair of bidirectional recurrent neural networks f ($\theta_T$, T) and g ($\theta_Q$, Q), to encode the text and the question, where T represents the text, $\theta_T$ represents the parameters of the text encoder, and $T \in \mathbb{R}^{D \times N}$ is a matrix representation of the text (comprising N entities), whose columns are individual entity embeddings $t_i$. Likewise, Q represents the question, $\theta_Q$ represents the parameters of the question encoder, and $Q \in \mathbb{R}^{D \times N_Q}$ is a matrix representation of the question (comprising $N_Q$ entities), whose columns are individual entity embeddings $q_j$. D represents the embedding dimension.

The bidirectional recurrent neural networks have gated recurrent units (GRU) that scan over the columns (e.g., the entity embeddings) of the input matrix T. The first GRU's hidden state gives a representation of the ith entity conditioned on the preceding entities. To include context from the proceeding entities, a second GRU is run over the matrix T in the reverse direction. The combination of the first and the second GRUs are referred to herein as a biGRU. At each step, the biGRU outputs two d-dimensional encoding vectors, one for the forward direction and one for the backward direction. The encoding vectors are concatenated to yield a vector f ($t_i$) $\in \mathbb{R}^{2d}$.

The biGRU that processes the question is similar, but a single-vector representation of the question is obtained by concatenating the final forward state with the initial backward state, which is denoted as g(Q) $\in \mathbb{R}^{2d}$.

Returning to FIG. 3, the process continues at block 310 where a probability distribution over the set of possible answers is determined. A probability of correctness is determined or estimated for each candidate answer. The sum of the probabilities for all of the possible answers is substantially equal to one hundred percent.

In one embodiment, the probability that the ith entity in the text T answers the question Q is modeled as:

$$s_i \propto \exp(f(t_i \cdot g(Q))), \qquad \text{Equation 1}$$

which takes the inner product of the text and the question representations followed by a softmax function (e.g., a normalized exponential). In many cases, unique entities repeat in a text. Therefore, the probability that an entity w is the correct answer can be computing using the following equation:

$$P(w|T,Q) = \Sigma_{i:t_i = w} s_i \qquad \text{Equation 2}$$

This probability is evaluated for each unique entity in the text T, which produces a probability distribution over the unique entities in the text T. Essentially, determining a probability distribution over the unique entities determines a probability distribution over a set of possible candidates.

Next, as shown in block 315, the set of possible candidates is filtered or ranked to produce a set of candidate answers (e.g., a set of probable answers). In one embodiment, the first processing circuitry filters the set of possible answers by outputting the set $\{p_1, \ldots, p_K\}$ of the K highest word probabilities from Equation 2, along with a set of K most probable answers $\{\hat{a}_1, \ldots, \hat{a}_K\}$. The set of candidate answers is then output and sent to the second processing circuitry.

Figure 4:
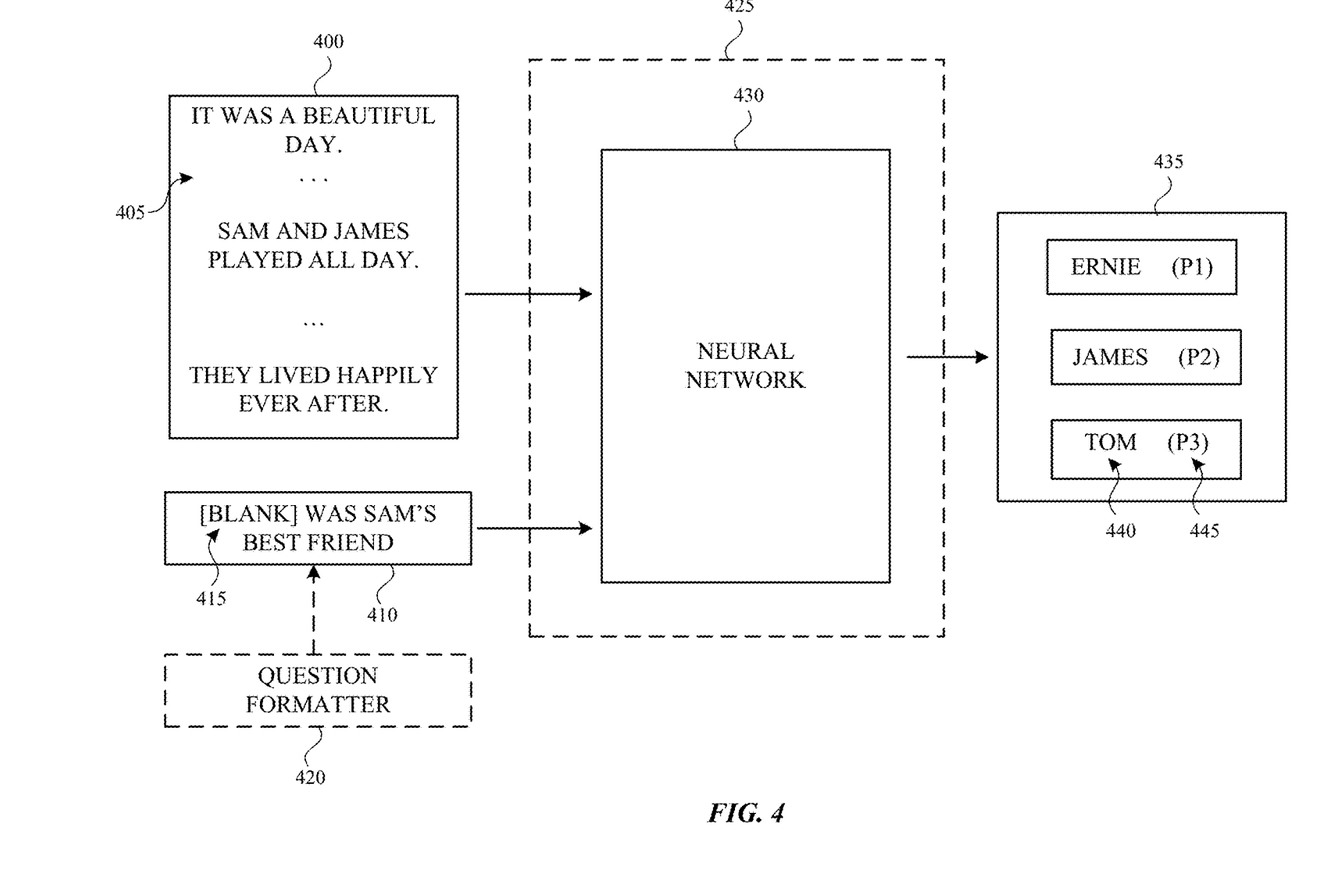
FIG. 4 is process flow diagram illustrating the method shown in FIG. 3.

FIG. 4 is process flow diagram illustrating the method shown in FIG. 3. A document 400 includes one or more passages of text 405. In the illustrated embodiment, the passage(s) of text include three sentences: "It was a beautiful day"; "Sam and James played all day"; and "They lived happily ever after." A question 410 is received relating to the one or more passages of text 405 in the document 400. In the illustrated embodiment, the question 410 is "[Blank] was Sam's best friend", a Cloze-style question where one entity in the question is missing (e.g., blank 415).

In other embodiments, a question formatter 420 can convert a non-Cloze-style question into a Cloze-style question when the received question is not a Cloze-style question. As described earlier in conjunction with FIG. 3, the question formatter 420 is optional and is not utilized when the question is submitted as a Cloze-style question.

The passage(s) of text 405 and the question 410 are input into the first processing circuitry 425, which includes one or more neural networks (represented by neural network 430). The neural network 430 performs the method shown in FIG. 3. The neural network 430 processes the question 410 and the passages of text 405 to predict a set of possible candidate answers 435.

In the illustrated embodiment, the set of candidate answers 435 includes three candidate answers 440 and the probabilities associated with each candidate answer 445. The candidate answer "Ernie" is associated with a probability "P1", where "P1" represents the probability that "Ernie" is the correct or predicted answer. Similarly, the candidate answer "James" is associated with a probability of "P2" and the candidate answer "Tom" is associated with a probability "P3.

In one embodiment, the neural network 430 is a Pointer Network that uses a pair of biGRUs to point to the locations of the candidate answers in the text 405. The Pointer Network can be implemented as any suitable Pointer Network that generates a probability distribution over the entities and is fully differentiable. For example, in one embodiment, the Pointer Network is an Attention Sum Reader Network, although this is not required. The Pointer Network may be a match-LSTM Network, a Multi-Perspective Context Matching Network, or a ReasoNet in other embodiments.

Figure 5:
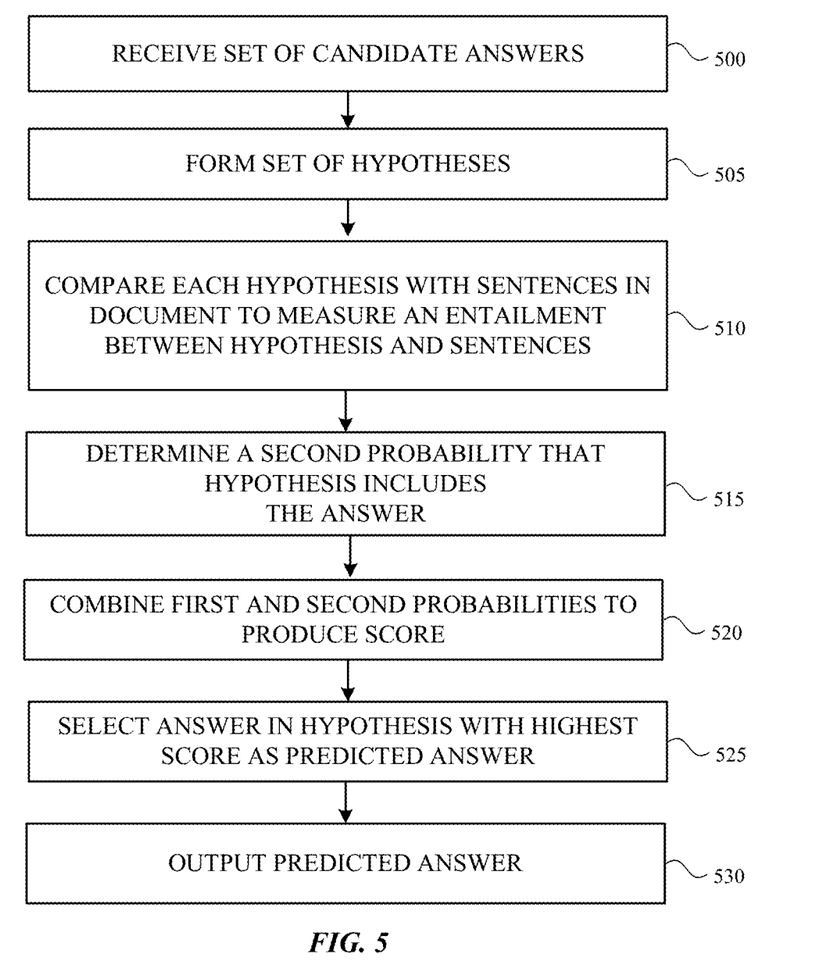
FIG. 5 is a flowchart depicting a method of predicting an answer to the question from the text in the document.

FIG. 5 is a flowchart depicting a method of predicting an answer to the question from the text in the document. FIG. 5 depicts the operations that may be performed in block 210 in FIG. 2. The method forms hypotheses by inserting the candidate answers into the question and then estimates the concordance of each hypothesis with each sentence in the supporting text. Each estimate is used as a measure of the probability associated with a hypothesis (a second probability). Each second probability is an aggregation of the estimates over all of the sentences in the supporting text. Based on the second probabilities, the candidate answers are re-ranked and a predicted answer selected and output. Essentially, a second processing circuitry performs a deeper semantic comparison of the question with the supporting text to re-rank the candidate answers in the set of candidate answers and, based on the re-ranking, to select or output a predicted answer.

Initially, as shown in block 500, the second processing circuitry receives the set of candidate answers from the first processing circuitry. Thereafter, at block 505, the second processing circuitry forms a hypothesis using each candidate answer. The second processing circuitry inserts a candidate answer into the question sequence Q at the location of the blank. In other words, the second processing circuitry fills in the blank with the candidate answer.

Next, as shown in block 510, the second processing circuitry compares each hypothesis with the sentences in the text to measure the textual entailment between the hypothesis and the sentences. In one embodiment, the text is encoded into a sequence of sentences $N_s$: $T=\{t_1, \ldots, t_N\} \rightarrow \{S_1, \ldots, S_N\}$, where $S_i$ is a sequence of entities. For each hypothesis and each sentence, the input to the second processing circuitry consists of two matrices: $S_i \in \mathbb{R}^{D \times |S_i|}$, whose columns are the embedding vectors for each entity of the sentence $S_i$, and $H_k \in \mathbb{R}^{D \times |H_k|}$, whose columns are the embedding vectors for each entity in the hypothesis $H_k$. In some aspects, the entities in the document are represented with trainable embeddings. The trainable embeddings are represented using a matrix $W \in \mathbb{R}^{D \times |V|}$, where D is the embedding dimension and $|V|$ is the vocabulary size. The embedding vectors come from the matrix W.

In some implementations, the second processing circuitry includes a pair of convolutional networks and a recurrent neural network with GRUs (hereinafter a GRU). The matrices $S_i$ and $H_k$ are input into the convolutional network that augments $S_i$ with a matrix $M \in \mathbb{R}^{2 \times |S_i|}$. The first row of M contains the inner product of each entity embedding in the sentence with the candidate answer embedding, and the second row contains the maximum inner product of each sentence entity embedding with any entity embedding in the question.

The augmented $S_i$ is then convolved with a bank of filters $F^S \in \mathbb{R}^{(D+2) \times m}$, while $H_k$ is convolved with filters $F^H \in \mathbb{R}^{D \times m}$, where m is the convolution filter width. In some embodiments, a bias term is added and a nonlinearity is applied following the convolution.

To measure the textual entailment between a hypothesis and the sentences, a scalar similarity score is computed between the vector representations using the bilinear form:

$$\varsigma = r_{S_i}^T R r_{H_k} \qquad \text{Equation 3}$$

where $R \in \mathbb{R}^{N_F \times N_F}$ is a matrix of trainable parameters. The similarity score is then concatenated with the sentence and hypothesis representations to obtain a vector, $x_{ik}=[\varsigma; r_{S_i}; r_{H_k}]^T$. Other embodiments can determine the textual entailment differently.

The resulting sequence of $N_S$ vectors feeds into a GRU for synthesis, of hidden dimension $d_S$. In some instances, the evidence for a particular hypothesis is distributed over several sentences. For example, a hypothesis of "the football is in the park," can be based on one sentence of "Sam picked up the football" and a subsequent sentence of "Sam ran to the park." The second processing circuitry synthesizes distributed information by running a GRU over $x_{ik}$, where i indexes sentences and represents the step dimension. In some embodiments, the second processing circuitry processes all K hypotheses in parallel and the estimated entailment of each hypothesis is normalized by the convolutional network using a softmax classifier, $e_k \propto \exp(y_k)$, where $y_k$ is a scalar that represents the collected evidence for $H_k$ based on the text.

Returning to block 515 in FIG. 5, the second processing circuitry determines a second probability that the hypothesis includes the answer. In one embodiment, the evidence $e_k$ produced by the second processing circuitry is interpreted as a correction to the probabilities $p_k$ output by the first processing circuitry. In such embodiments, the second probability for each hypothesis can be computed according to Equation 4.

$$\pi_k \propto e_k p_k. \qquad \text{Equation 4}$$

Next, as shown in block 520, the first and the second probabilities are combined to produce a score. The answer in the hypothesis with the highest score is then selected as the predicted answer, and the predicted answer is output (blocks 525, 530). The predicted answer can be presented to a user (e.g., user 105 in FIG. 1) using any suitable output device. In one embodiment, the selection of the predicted answer causes the predicted answer to be displayed, such as on a display included in, or connected to, a client-computing device (e.g., client-computing device 110 in FIG. 1).

Figure 6:
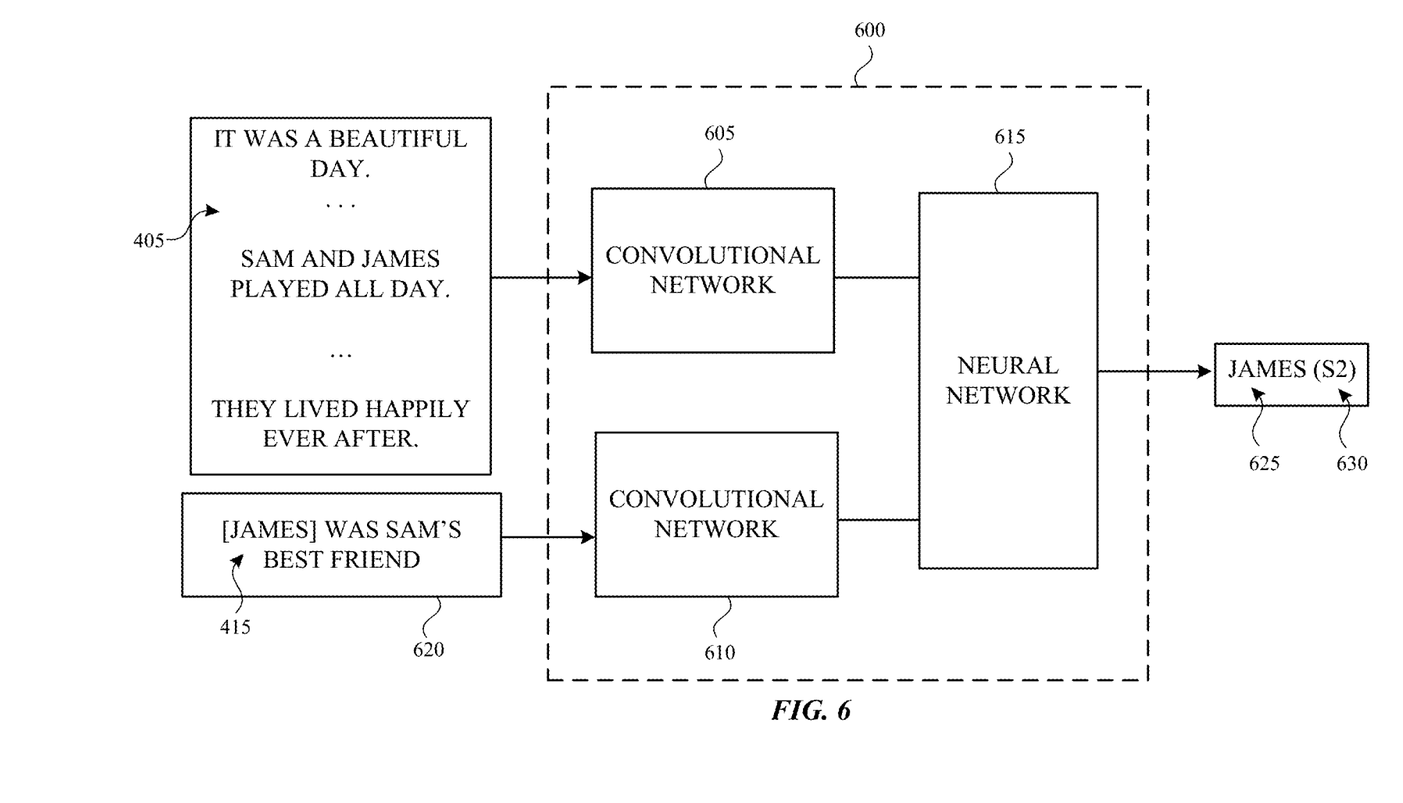
FIG. 6 is process flow diagram illustrating the method shown in FIG. 5.

FIG. 6 is a process flow diagram depicting the method of FIG. 5. As shown, the second processing circuitry 600 includes a first convolutional network 605 and a second convolutional network 610 whose outputs are received by one or more neural networks (represented by neural network 615).

A hypothesis 620 is produced by filing in the blank 415 (FIG. 4) with each candidate answer. As shown in FIG. 6, the candidate answer "James" 625 fills the blank 415. The first convolutional network 605 receives the text 405 and encodes the text 405 as a sequence of sentences $N_s$. The second convolutional network 610 receives and encodes the hypothesis 620. Essentially, the pair of convolutional networks 605, 610 generate abstract representations of the hypothesis and each sentence in the sequence of sentences.

The encoded hypothesis and the encoded sequence of sentences are then input into the neural network 615 that compares the hypothesis with the sentences to measure the textual entailment between the hypothesis and the sentences. As described earlier, the neural network 615 can be a GRU that estimates and aggregates the entailment over all of the sentences.

The neural network 615 generates a second probability for each candidate answer and combines the first and the second probabilities to produce a score 630. As shown in FIG. 6, the neural network 615 output the score "S2" 630 for the candidate answer "James" 625. When all of the candidate answers have been processed, the candidate answer with the highest score is selected as the predicted answer. The predicted answer may then be provided to a client-computing device (e.g., client-computing device 110 in FIG. 1).

As should be appreciated, FIGS. 2-6 are described for purposes of illustrating the present methods and systems and is not intended to limit the disclosure to a particular sequence of steps or a particular combination of hardware or software components. The flowcharts shown in FIGS. 2, 3, and 5 can include additional blocks or omit one or more blocks. For example, in 520 in FIG. 5 may be omitted and the operation at block 525 can select the candidate answer with the highest second probability as the predicted answer. Additionally or alternatively, the mathematical computations and equations described in conjunction with FIGS. 3-6 are non-limiting examples and other embodiments can perform the methods using different computations and equations.

As described earlier, the combination of the first and the second processing circuitries provides a trade-off between computational complexity and accuracy. In some instances, the operations of the second processing circuitry can be complex and/or computationally expensive to run. The first processing circuitry may reduce this cost by filtering or reducing the number of candidate answers that is processed by the second processing circuitry. Additionally or alternatively, the combination of the first and the second processing circuitries provides an architecture that employs mathematical operations that are fully differential and is end-to-end trainable. Propagating the first probabilities produced by the first processing circuitry forward and combining the first probabilities with the second probabilities generated by the second processing circuitry renders the NLCS end-to-end differentiable.

Figure 7:
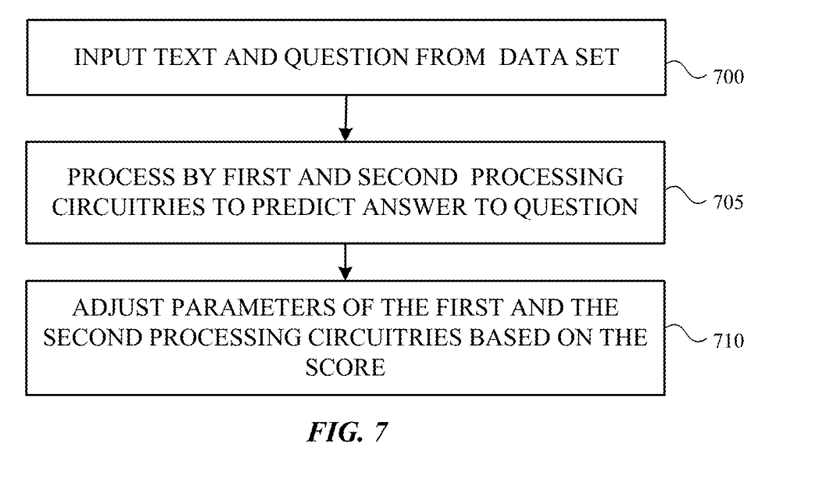
FIG. 7 is a flowchart illustrating a method of training a natural language comprehension system.

FIG. 7 is a flowchart illustrating a method of training a natural language comprehension system (NLCS). In some embodiments, an NLCS may be trained using one or more datasets that include the questions and the associated or supporting text. One example dataset is the Cable News Network (CNN) dataset. The CNN dataset is built using articles scraped from the CNN website. The articles themselves form the text, and questions are generated synthetically from short summary statements that accompany each article.

Another example dataset is the Children's Book Test (CBT) dataset. The CBT dataset is constructed similarly to the CNN dataset, but from children's books. The texts are obtained from book excerpts of twenty sentences, and a question is generated by replacing a single word in a subsequent sentence (e.g., in the twenty-first sentence).

Initially, a text and a question from one or more datasets are received and processed by the first and the second processing circuitries (blocks 700 and 705). As described earlier, example datasets include, but are not limited to, the CNN dataset and the CBT dataset. The text and the question are processed according to the methods described above in conjunction with FIGS. 3-6. Based on the score produced by the second processing circuitry (e.g., the combined first and second probabilities), the parameters of the first and the second processing circuitry are adjusted to reduce or minimize a total cost associated with the first and the second processing circuitries (block 715).

In one embodiment, the parameters of the biGRUs and GRUs are optimized to reduce the total cost. The parameters include the weight matrices that define the connections between the different layers in the neural network. In particular, the parameters are adjusted to reduce or minimize a total cost that includes two terms, $\mathcal{L}_e$ and $\mathcal{L}_R$. $\mathcal{L}_e$ represents the cost associated with the first processing circuitry while $\mathcal{L}_R$ represents the cost associated with the second processing circuitry. The loss associated with the first processing circuitry is given by Equation 5:

$$\mathcal{L}_e = \mathbb{E}_{(Q,T,a^*,A)}[-\log P(a^*|T,Q)],  \quad\quad \text{Equation 5}$$

where $P(a^*|T, Q)$ is as defined in Equation 2 and $a^*$ denotes the true answer.

The loss associated with the second processing circuitry can be defined by Equation 6:

$$\mathcal{L}_R = \mathbb{E}_{(Q,T,a^*,A)}[\Sigma_{\hat{a}_i \in \{\hat{a}_1,\ldots,\hat{a}_K\} \in a^*}[\gamma - \pi^* + \pi_{\hat{a}_i}]_+], \quad \text{Equation 6}$$

where $\gamma$ is a margin hyperparameter, $\{\hat{a}_1, \ldots, \hat{a}_K\}$ is the set of K answers proposed by the second processing circuitry, and $[\gamma-\pi^*+\pi_{\hat{a}_i}]_+$ indicates truncating $[\gamma-\pi^*+\pi_{\hat{a}_i}]$ to be non-negative. Intuitively, the loss $\mathcal{L}_R$ indicates that the end-to-end probability $\pi^*$ for the correct answer should be at least $\gamma$ larger than the probability $\pi_{\hat{a}_i}$ for any other answer proposed by the second processing circuitry. During training, the correct answer may be missed by the second processing circuitry, especially in early periods or epochs. Thus, during training, the correct answer can be forced into the top K set.

The total loss term $\mathcal{L}_{ER}$ is defined by the weighted combination of $\mathcal{L}_E$ and $\mathcal{L}_R$, which can be represented as:

$$\mathcal{L}_{ER} = \mathcal{L}_E + \lambda \mathcal{L}_R, \quad\quad \text{Equation 7}$$

Where $\lambda$ is a hyperparameter for weighting the relative contribution of the losses in the first and the second processing circuitries.

Figure 8:
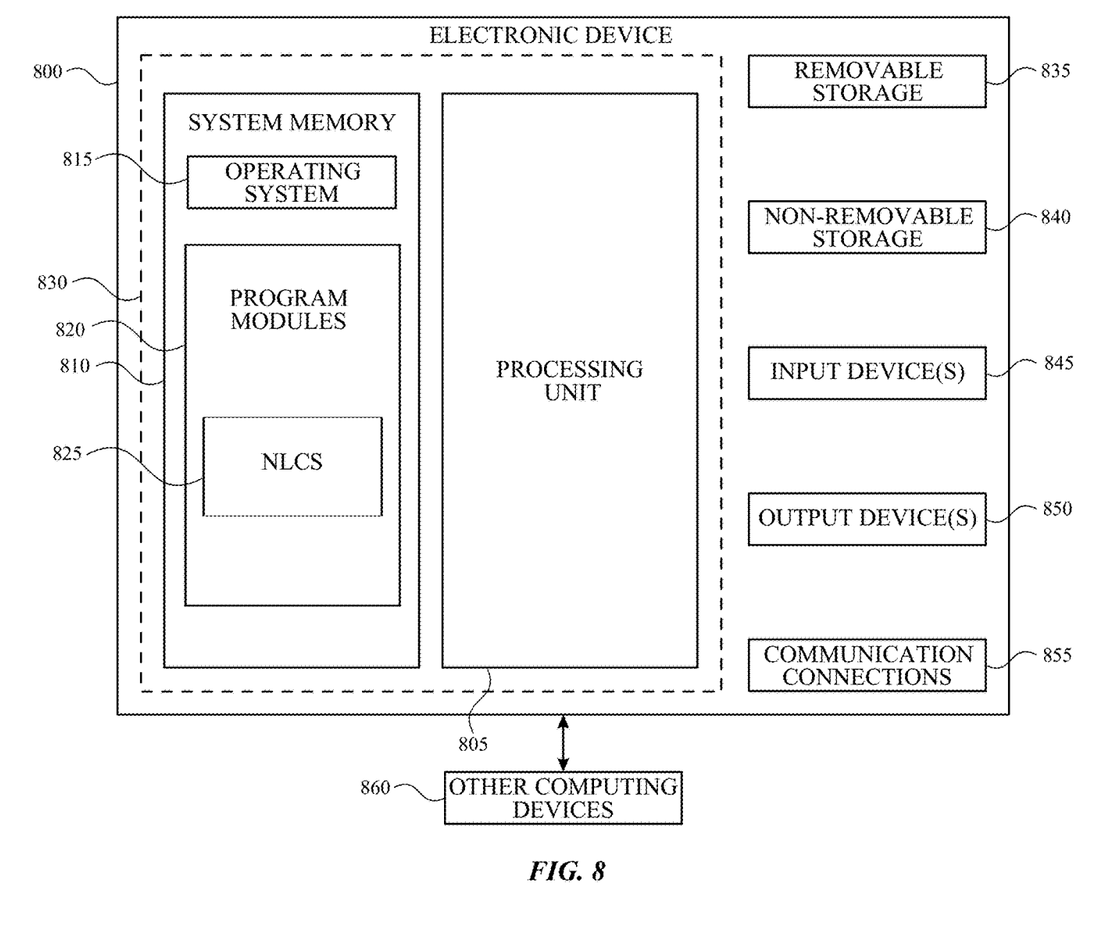
FIG. 8 is a block diagram illustrating example physical components of a computing device with which aspects of the disclosure may be practiced.

FIG. 8 is a block diagram illustrating physical components (e.g., hardware) of an electronic device 800 with which aspects of the disclosure may be practiced. The components described below may be suitable for the computing devices described above, including the server-computing device 125 in FIG. 1).

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a NLCS program module 825. While executing on the processing unit 805, the NLCS program module 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication connections 855 allowing communications with other electronic devices 860. Examples of suitable communication connections 855 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 810, the removable storage device 835, and the non-removable storage device 840 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Figure 9:
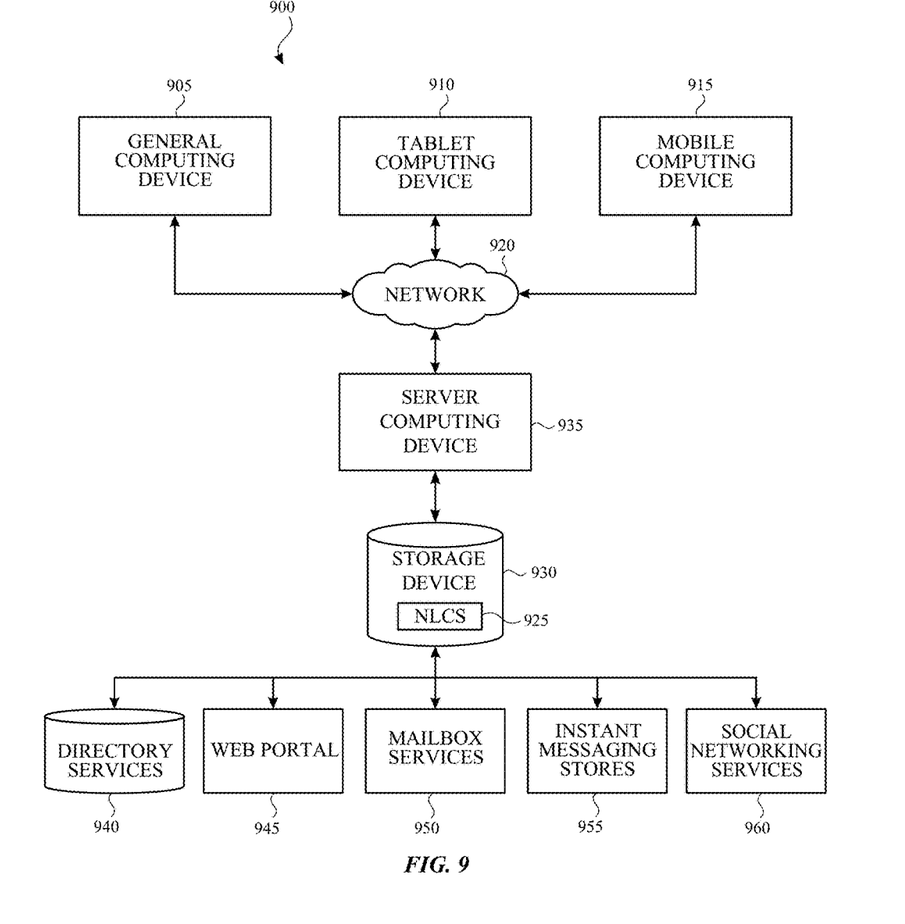
FIG. 9 is a block diagram of a distributed computing system in which aspects of the present disclosure may be practiced.

FIG. 9 is a block diagram illustrating a distributed system in which aspects of the disclosure may be practiced. The system 900 allows a user to submit a question relating to supporting text in a document through a general computing device 905 (e.g., a desktop computer), a tablet computing device 910, and/or a mobile computing device 915. The general computing device 905, the tablet computing device 910, and the mobile computing device 915 can each include the components shown in the client-computing device 110 of FIG. 1.

The general computing device 905, the tablet computing device 910, and the mobile computing device 915 are each configured to access one or more networks (represented by network 920) to interact with the NLCS 925 stored in one or more storage devices (represented by storage device 930) and executed by one or more server-computing devices (represented by server-computing device 935).

In some aspects, the server-computing device 935 can access and/or receive various types of documents that include the supporting text. The documents can be stored in the storage device 930 or transmitted from other sources, such as a directory service 940, a web portal 945, mailbox services 950, instant messaging services 955, and/or social networking services 960. In some instances, these sources may provide robust reporting, analytics, data compilation and/or storage service, etc., whereas other services may provide search engines or other access to data and information, images, videos, document processing and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
  first processing circuitry;
  second processing circuitry operably connected to the first processing circuitry; and
  one or more storage devices storing computer executable instructions that when executed by the first and the second processing circuitries, perform a method, the method comprising:
    generating, by the first processing circuitry, a question relating to natural-language text and a set of candidate answers to the question based on the natural-language text, wherein the natural-language text includes at least part of each candidate answer;
    generating a first probability of a first candidate answer being a correct answer to the question based on a combination of the question and the natural-language text;
    generating, by the second processing circuitry, a first hypothesis by inserting the first candidate answer into the question;
    generating, based on the first probability and the first hypothesis appearing in the natural-language text, a second probability of the first candidate answer being the correct answer to the question, the second probability being a correction to the first probability of the first candidate answer being the correct answer to the question;
    generating, based on the first probability and the second probability, a score associated with the first candidate answer, wherein the score represents a degree of correctness of the first candidate answer of the set of candidate answers as the correct answer to the question; and
    based on the score associated with the first candidate answer, predicting the first candidate answer as the correct answer to the question.

2. The system of claim 1, wherein the first processing circuitry comprises a Pointer Network.

3. The system of claim 2, wherein the Pointer Network comprises a pair of bidirectional recurrent neural networks having gated recurrent units.

4. The system of claim 1, wherein the second processing circuitry comprises a pair of convolutional networks connected to a recurrent neural network having gated recurrent units.

5. The system of claim 1, wherein the operation of generating the question and the set of candidate answers to the question comprises:
  determining a set of possible answers to the question based on a review of the question and the natural-language text;
  determining the first probability of each possible answer being the correct answer to the question; and
  based on the first probabilities, filtering the set of possible answers to produce the set of candidate answers.

6. The system of claim 5, wherein the operation of generating, based on the first probability and the first hypothesis, the second probability of the first candidate answer being the correct answer to the question comprises:
  encoding the natural-language text into a sequence of sentences;
  comparing the first hypothesis with each sentence in the sequence of sentences;
  measuring a natural-language interference between the first hypothesis and each sentence in the sequence of sentences; and
  determining the second probability of the first candidate answer being the correct answer to the question.

7. The system of claim 6, the method further comprising:
  transmitting the predicted first candidate answer as the correct answer to the question,
  wherein the transmitting the predicted first candidate answer includes:
    based on the score associated with each candidate answer, re-ranking the candidate answer in the set of candidate answers; and
    selecting, based on a score corresponding to re-ranked candidate answers in the first hypothesis, the first hypothesis as a predicted answer.

8. A computer-implemented method, the method comprising:
  generating, by a first processor, a question relating to natural-language text and a set of candidate answers to the question based on the natural-language text, wherein the natural-language text includes at least part of each candidate answer;
  generating a first probability of a first candidate answer being a correct answer to the question based on a combination of the question and the natural-language text;
  generating, by the second processing circuitry, a first hypothesis by inserting the first candidate answer into the question;
  generating, based on the first probability and the first hypothesis appearing in the natural-language text, a second probability of the first candidate answer being the correct answer to the question, the second probability being a correction to the first probability of the first candidate answer being the correct answer to the question;
  generating, based on the first probability and the second, a score associated with the first candidate answer, wherein the score represents a degree of correctness of the first candidate answer of the set of candidate answers as the correct answer to the question; and
  based on the score associated with the first candidate answer, predicting the first candidate answer of the set of candidate answers as the correct answer to the question.

9. The computer-implemented method according to claim 8, wherein the first processor comprises a Pointer Network.

10. The computer-implemented method according to claim 9, wherein the Pointer Network comprises a pair of bidirectional recurrent neural networks having gated recurrent parts.

11. The computer-implemented method according to claim 8, wherein the second processor comprises a pair of convolutional networks connected to a recurrent neural network having gated recurrent parts.

12. The computer-implemented method according to claim 8, wherein the generating the question and the set of candidate answers to the question comprises:
  determining a set of possible answers to the question based on a review of the question and the natural-language text;
  determining the first probability of each possible answer being the correct answer to the question; and
  based on the first probabilities, filtering the set of possible answers to generate the set of candidate answers.

13. The computer-implemented method according to claim 12,
  wherein the operation of generating, based on the first probability and the first hypothesis, the second probability of the first candidate answer being the correct answer to the question comprises:
encoding the natural-language text into a sequence of sentences;
comparing the first hypothesis with each sentence in the sequence of sentences;
measuring a natural-language interference between the first hypothesis and each sentence in the sequence of sentences; and
determining the second probability of the first candidate answer in the being the correct answer to the question.

14. The computer-implemented method according to claim 13, the method further comprising:
transmitting the predicted first candidate answer as the correct answer to the question,
wherein the operation of transmitting the predicted first candidate answer includes:
based on the score associated with each candidate answer, re-ranking the candidate answer in the set of candidate answers; and
selecting, based on a score corresponding to each of the re-ranked candidate answer in the first hypothesis, the first hypothesis as a predicted answer.

15. A device, comprising:
a first processor;
a second processor connected to the first processor; and
one or more storage devices storing computer executable instructions that when executed by the first and the second processors cause the device to:
generate, by the first processor, a question relating to natural-language text and a set of candidate answers to the question based on the natural-language text, wherein the natural-language text includes at least part of each candidate answer;
generate a first probability of a first candidate answer being a correct answer to the question based on a combination of the question and the natural-language text;
generate, by the second processor, a first hypothesis by inserting the first candidate answer into the question;
generate, based on the first probability and the first hypothesis appearing in the natural-language text, a second probability of the first candidate answer being the correct answer to the question, the second probability being a correction to the first probability of the first candidate answer being the correct answer to the question;
generate, based on the first probability and the second probability, a score associated with the first candidate answer, wherein the score represents a degree of correctness of the first candidate answer of the set of candidate answers as the correct answer to the question; and
based on the score associated with the first candidate answer, predict the first candidate answer as the correct answer to the question.

16. The device according to claim 15, wherein the first processor comprises a Pointer Network.

17. The device according to claim 16, wherein the Pointer Network comprises a pair of bidirectional recurrent neural networks having gated recurrent parts.

18. The device according to claim 15, wherein the second processor comprises a pair of convolutional networks connected to a recurrent neural network having gated recurrent parts.

19. The device according to claim 15, wherein the generating the question and the set of candidate answers to the question comprises:
determining a set of possible answers to the question based on a review of the question and the natural-language text;
determining the first probability of each possible answer being the correct answer to the question; and
based on the first probabilities, filtering the set of possible answers to produce the set of candidate answers.

20. The device according to claim 19, wherein the operation of generating, based on the first probability and the first hypothesis, the second probability of the first candidate answer being the correct answer to the question comprises:
encoding the natural-language text into a sequence of sentences;
comparing the first hypothesis with each sentence in the sequence of sentences;
measuring a natural-language interference between the first hypothesis and each sentence in the sequence of sentences; and
determining the second probability of the first candidate answer being the correct answer to the question.

* * * * *